United States Patent [19]

Bowen et al.

[11] Patent Number: 4,468,505

[45] Date of Patent: Aug. 28, 1984

[54] COATING COMPOSITION

[75] Inventors: Michael W. Bowen, Midlothian, Va.; Robert G. Parrish, Wilmington, Del.

[73] Assignee: E. I. Du Pont de Nemours and Company, Wilmington, Del.

[21] Appl. No.: 409,324

[22] Filed: Aug. 18, 1982

[51] Int. Cl.$^3$ .................... C08G 69/48; C08L 77/00
[52] U.S. Cl. .................................... 525/432; 525/430
[58] Field of Search ............................. 525/432, 430

[56] References Cited

U.S. PATENT DOCUMENTS

| | | | |
|---|---|---|---|
| 3,190,718 | 6/1965 | Schoeneberg et al. | 8/130.1 |
| 3,455,734 | 7/1969 | Jones et al. | 117/138.8 |
| 3,473,956 | 10/1969 | McIntyre et al. | 117/138.8 |
| 3,632,666 | 1/1972 | Okazaki et al. | 525/432 |
| 3,639,502 | 2/1972 | Okazaki et al. | 525/432 |

FOREIGN PATENT DOCUMENTS

| | | |
|---|---|---|
| 1108811 | 4/1968 | United Kingdom . |
| 1108812 | 4/1968 | United Kingdom . |
| 1124271 | 8/1968 | United Kingdom . |

*Primary Examiner*—John C. Bleutge
*Assistant Examiner*—A. L. Carritto

[57] ABSTRACT

Certain poly[hexamethylene adipamide]-poly[poly-(oxyethylene) adipamide] copolymers which provide soil release to nylon fabrics can be applied from solution directly to a threadline without heat-setting. Aqueous alcoholic solutions of the copolymers are preferred for such application.

3 Claims, No Drawings

COATING COMPOSITION

BACKGROUND OF THE INVENTION

Certain nylon products are subject to oily soiling and are difficult to clean. Improved soil and stain release has long been sought for carpet, upholstery and apparel applications. U.S. Pat. No. 3,473,956 discloses preparation of polymeric compositions which are said to impart such properties to fabrics but the fabrics must be heat-set after application of the treating agent in order to provide durable effects. More specifically, U.S. Pat. No. 3,473,956 teaches that it is essential to heat the polymeric composition in contact with the surface to be protected. Temperatures required to produce the durable surface treatment are said to be above 40° C. and preferably in excess of 150° C. Unfortunately, facilities for heat treatment of a spinning threadline after application of the polymeric composition are generally not available in typical fiber spinning operations. Attainment of durable soil release by application of a coating without the need for significant process or apparatus modification is a desirable objective.

SUMMARY OF THE INVENTION

The present invention is a novel polymeric composition for imparting soil release to nylon fabrics which can be applied from aqueous alcoholic solution directly to a threadline without the need for heat setting. The polymeric composition consists essentially of a poly[hexamethylene adipamide]-poly[poly((oxyethylene) adipamide] copolymer that is soluble at room temperature at 1% by weight concentration in a solvent composed of equal parts by volume of water and ethanol and wherein the molecular weight of the poly[poly(oxyethylene)adipamide] grouping calculated as poly(oxyethylene)diamine is between about 300 and 1200, preferably between about 600 and 900, the weight fraction of poly(hexamethylene adipamide) calculated as nylon 6—6 salt is between 18 and 37%, preferably between 19 and 30%, and said copolymer composition falls within the area bounded by XY, YZ and ZX of the FIGURE. For purposes of this description, poly(oxyethylene) diamine is intended to include minor amounts i.e. less than 25 mol % oxypropylene groups with the oxyethylene groups.

THE DRAWING

The FIGURE is a graph that defines poly[hexamethylene adipamide]-poly[poly(oxyethylene) adipamide] copolymers in terms of the weight fraction of nylon 6—6 of salt and the molecular weight of the poly(oxyethylene)diamine.

DETAILED DESCRIPTION OF THE INVENTION

Preparation of Polymeric Composition

The compositions of the present invention can be made conveniently by reacting poly(oxyethylene) diamine of appropriate molecular weight with adipic acid and nylon 6—6 salt at elevated temperatures and with removal of water. Poly(oxyethylene) diamines are commercially available as "Jeffamines" from the Jefferson Chemical Co. and contain minor amounts, i.e., less than about 25 mol % of oxypropylene groups with the oxyethylene groups. In Jeffamine ED600, the poly(oxyethylene) diamine which includes minor amounts of oxypropylene units is believed to have an average molecular weight of about 600. The analogous diamines, Jeffamine ED900 and 2000, have average molecular weights of approximately 900 and 2000, respectively. In the Jeffamines under consideration, the amino groups are attached to the poly(oxyethylene) grouping through oxypropylene groups.

The adipic acid is present in the reaction mixture in an approximately equimolar basis with the poly(oxyethylene) diamine and the ratio of nylon 6—6 salt to poly(oxyethylene) diamine is varied depending on the percentage desired in the final product.

For the purposes of this invention, the weight fraction (expressed as %) of nylon 6—6 in the novel polymeric composition based on the reactants is calculated from the formula below:

$$\frac{\text{Weight 6-6 Salt}}{\left[\begin{array}{c}\text{Weight Poly(oxy-} \\ \text{ethylene) diamine}\end{array}\right] + \left[\begin{array}{c}\text{Weight} \\ \text{Adipic Acid}\end{array}\right] + \left[\begin{array}{c}\text{Weight} \\ \text{6-6 Salt}\end{array}\right]} \times 100\%$$

The calculation does not account for the water lost during polymerization. The small difference in values would be insignificant. The nylon 6—6 concentration at original reactant levels can be determined from the copolymer by conventional analytical procedures involving hydrolysis. The values reported herein were based on the reactants.

As an illustration, a copolymer candidate having a weight fraction of nylon 6—6 of 24% was prepared in the following way:

A mixture of 312 g "Jeffamine" ED600, 76 g adipic acid, and 125.8 g nylon 6—6 salt (precipitated from aqueous solution with isopropanol and dried at 70° C. under vacuum.) was purged with nitrogen for 30–60 minutes at room temperature in a 1000-ml, three-neck flask fitted with (1) a nitrogen bleed, (2) a mechanical stirrer, and (3) jacketed reflux column. The reflux column was connected in sequence to a still head, a condenser and a two-neck collecting flask. The stirred reaction mixture was heated in a Woods metal bath (bath temperature=210° C.) under total reflux for 60 minutes. During the second stage, the reflux column was heated by steam to remove water and volatiles. The temperature of the bath was raised to 286°–290° C., and maintained for 100 minutes. The polymer was cooled to room temperature under nitrogen. The flask was then broken, the polymer removed, crushed and milled with dry ice.

The polymeric product consists essentially of poly[hexamethylene adipamide]-poly[poly(oxyethylene) adipamide] copolymer.

Application of Polymeric Composition

The polymeric compositions of the present invention are applied from aqueous or aqueous alcoholic solution at concentration of at least 0.5% by weight. In preferred practice, the solutions are applied directly to the threadline along with the finish that is normally applied. Concentrations of 0.6 and 1% by weight are used in the treating solutions in the examples illustrated below.

Test Procedures

As mentioned previously, the polymeric compositions of the invention must be soluble before application to the nylon substrate and provide effective soil release (stain release) to the substrate after it has been applied. As described in detail below, the substrate is tested by laundering it with a household detergent and then spotting it with a standardized soil composition which severely stains untreated nylon fabrics. In the most demanding test, nylon velour upholstery fabric is used because it is considered to be the most difficult to protect and its use in the test therefore facilitates discrimination between coating candidates. The soiled substrate is laundered repeatedly, spotting it with more of the standardized soil composition after every 5 launderings with household detergent. Two aspects of soil release are considered important in evaluating the soiled fabrics. First, when the fabric is initially tested, there should be a high level of soil release, so that any stain which can be found on the fabric at all is relatively faint and not readily apparent on casual observation. Second, after many cycles of staining and laundering, any deterioration in the level of soil release with respect to the initial level of soil release should be relatively minor. Thus, in the subjective soil release rating scale described below, the polymeric composition used to coat the substrate is considered as providing good soil release only if (1) the soil release rating of the soiled substrate after 5 launderings with household detergent is no higher than 1.7 units and (2) any increase in the soil release rating of the soiled substrate after at least 20 launderings with household detergent is no more than 1.0 unit, with respect to the soil release rating of the soiled substrate after the first laundering with household detergent.

| SCALE OF SUBJECTIVE SOIL RELEASE RATINGS | |
|---|---|
| Appearance of Substrate | Soil Release Rating |
| Clean | 1.0 |
| Very slight stain which can only be seen with close inspection | 1.2 |
| Cream colored stain, slightly darker than substrate; stain not readily apparent | 1.5 |
| Light yellow stain can be observed at all angles of observation, but stain not readily apparent | 1.7 |
| Readily apparent yellow stain | 2.0 |
| Dark yellow or tan stain | 2.5 |
| Yellow brown stain | 3.0 |
| Brown stain | 3.5 |
| Dark brown stain | 4.0 |
| Black stain | 5.0 |
| The soil release rating values of 1.2 and 1.7 are relatively fine discriminations which may be omitted, especially when there are many fabrics to be evaluated. When this is done, the fabrics are rated to the nearest 0.5 unit. | |

Soil Release Test Method

Fabrics (coated substrates and controls containing no coating) were evaluated by a method adapted from Test Method 130-1969 of the American Association of Textile Chemists and Colorists (AATCC); see AATCC Technical Manual, Volume 46, 1970, pages 223-4. In the AATCC Method, a value of 5 is the best rating rather than the worst. A standardized soil composition is prepared by diluting used crankcase oil with a colorless liquid paraffin ("Nujol") until the diluted crankcase oil is capable of creating a stain substantially similar to the AATCC Standard Stain 3.

Fabric samples, together with five cotton towels, were laundered once with a household detergent ("Tide") to remove excess coating, then dried hot for 50 minutes. The samples were then soiled by applying the standardized soil composition, made as described above, in a pattern of five closely-spaced spots. The soil was pressed into the fabric for 60 seconds under a 2-Kg. weight on glassine paper. The soiled samples, together with five cotton towels, were laundered within 30 minutes, using a laboratory standard detergent (AATCC standard detergent 124). Samples and towels were dried hot for 50 minutes, and the fabrics (which had now been laundered once with household detergent and once with laboratory standard detergent) were subjectively rated for soil release in accordance with the rating scale shown above. These ratings are reported as the 1X ratings.

Samples and towels were then laundered four times, using the household detergent, and dried hot after the final wash. Soil was then applied to the samples in a second location in a pattern of five closely-spaced spots and pressed into the samples as before, after which samples and towels were laundered with the laboratory standard detergent and dried for 50 minutes. The twice-spotted fabrics, which had now been laundered five times with household detergent and twice with laboratory standard detergent, were evaluated by examining the new (second) spotted area and giving it a soil release rating based on the rating scale above. These ratings are reported as the 5X ratings. Samples and towels were then washed five more times with household detergent and dried hot after the final wash. Soil was then applied to a third location and the samples and towels were laundered with the laboratory standard detergent, dried, and rated for soil release with respect to the new (third) spotted area. These ratings, which correspond to samples which had now been laundered ten times with household detergent and three times with laboratory standard detergent, are reported as the 10X ratings. The cycle of five launderings with household detergent, soil application to a new area, laundering with the laboratory standard detergent, and rating of the newest soiled area was repeated to a total of at least 20 launderings with household detergent. In the examples, some of the fabrics were evaluated to the 25th laundering with household detergent, and in some of these cases the fabrics were not evaluated after the 20th laundering with household detergent. For such samples, the results of the evaluation after the 25th laundering were used in place of results from the 20th laundering in determining whether the coating compositions had provided good long-term soil-release protection to the substrate, with any increase in the soil release rating being no more than 1.0 unit with respect to the soil release rating after the first laundering.

Solubility Test Method

Solubility of the polymeric compositions was measured by adding 1 g of the composition to 99 g of a solvent mixture comprising equal parts by volume of ethanol (2B) and water. The mixture was warmed to 50° C. with stirring. Compositions which dissolved completely were rated soluble, while those which did not seem to dissolve at all were rated as insoluble. In the examples, a few compositions are identified as being mostly soluble, but with some insoluble matter apparent. These compositions appeared to be about at the borderline of solubility. Compositions completely soluble in equal parts of ethanol and water are preferred.

The polymeric compositions may frequently, as in Example 1, be added to a spin finish composition which contains a high proportion of water and yet be found to be mostly soluble and effective in providing the nylon threadline to which it is applied with effective soil release. Proportions of ethanol and water other than 1:1 may be used. Although the solubility of the polymeric compositions is evaluated at the 1.0 wt.% concentration, lower concentrations of the polymeric composition may be used, as shown in the examples.

A large number of candidates were prepared and evaluated for solubility and for effective soil release, with the dual criteria that good soil release requires a high level of soil release in a fabric when it is new and relatively little deterioration in the level of soil release after the fabric has been subjected to many launderings. Candidates, identified by their weight fraction of nylon 6—6 and by the molecular weight of the poly(oxyethylene) grouping, were plotted on the graph of the FIGURE. It was found that there is only a narrow range (area bounded by XY, YZ, and ZX of the FIGURE) of compositions which have the required solubility prior to application and which provide the required effective soil release.

EXAMPLE 1

Using a poly(oxyethylene) diamine having an average molecular weight of about 600, a poly[hexamethylene adipamide]-poly[poly(oxyethylene) adipamide] copolymer having a weight fraction of nylon 6—6 of 24% was made substantially as described above. A nylon spin finish was prepared by blending together 65 parts by weight of isobutyl palmitate, 10 parts by weight of sodium di(2-ethylhexyl) sulfosuccinate, 10 parts by weight of the product obtained by condensing 1 mol of lauric acid with 13 mols of ethylene oxide, and 15 parts by weight of the potassium salt of a mixture consisting essentially of mono- and dioleyl orthophosphates, warming the mixture to 60° C., and adding it with agitation to 566 parts of water at 60° C. The copolymer was then added to the nylon spin finish in an amount such that it comprised 0.5 wt.% of the composition after it was added. The copolymer mostly dissolved in the nylon spin finish with a small amount of undissolved copolymer being dispersed in the form of fine particles.

The spin finish containing 0.5% of the copolymer was applied to a threadline of nylon filaments at the spinning position in conventional manner, after which the filaments were cold drawn and wound up as a yarn, hereinafter designated as the "treated yarn". The treated yarn was, when wound on the final yarn package, a 40 denier, 13 filament undelustered 6—6 nylon yarn of filaments of round cross section. Control yarn packages containing the same yarn treated with the same spin finish, except that none of the copolymer was added to the spin finish, were also prepared.

The treated yarn was 4-plied to 160 denier yarn, and a fabric was made from the plied yarn by knitting a tubing (using a "Fiber Analysis Knitter", made by Lawson-Hemphill Southern, Inc., Spartanburg, S.C.). The control yarn was 4-plied and made into a fabric in the same way.

The treated and control fabrics were evaluated in accordance with the soil release test. The soil-release ratings after the indicated number of launderings were as follows:

|  | No. of launderings | | | | |
|---|---|---|---|---|---|
|  | 1× | 5× | 10× | 15× | 20× |
| Rating of treated fabric | 1.2 | 1.2 | 1.0 | 1.5 | 1.2 |
| Rating of control fabric | 4.0 | 3.0 | 2.5 | 2.5 | 2.0 |

Gradual improvement in the control fabric above was believed to result from ingredients in the detergent. This improvement is too gradual, and too variable from sample to sample, to provide effective soil release to nylon fabrics generally.

EXAMPLE 2

A poly[hexamethylene adipamide]-poly[poly(oxyethylene) adipamide] copolymer having a weight fraction of nylon 6—6 of 24% was made from a poly(oxyethylene) diamine having an average molecular weight of about 600, as in Example 1. The copolymer was dissolved in a mixture of equal parts by volume of ethanol and water in a quantity sufficient to make an 0.5 wt. % solution of the copolymer. The copolymer was completely soluble in the 50/50 ethanol/water mixture.

Scoured 6—6 nylon upholstery velour fabric was cut into 3"×4" rectangular samples which were then heat-set at 100° C. and weighed. The fabric samples were soaked in the 0.5 wt. % solution of the copolymer for 20 minutes, the temperature of the solution being 55±3° C. at the beginning and 40°–45° C. at the end. The samples were then removed from the solution and squeezed to remove excess solution. One set of these samples was allowed to dry in air and other sets of samples were heated in an oven at 125±5° C., the residence time in the oven for the various samples being 5, 10, 15, 20, and 25 minutes, respectively. These fabric samples were designated as the "test fabrics". Other fabric samples were soaked for 20 minutes at the same temperature in a mixture of equal parts of ethanol and water which contained no copolymer. One set of these was allowed to dry in air and others were oven-dried at 125±5° C. for periods of 5, 10, 15, 20, and 25 minutes, respectively. These fabric samples were designated as the "control fabrics".

The test fabrics and control fabrics were evaluated in accordance with the soil release test, the control fabrics being laundered separately from the test fabrics. The soil release ratings after the indicated number of launderings were as follows:

|  | No. of launderings | | | | | |
|---|---|---|---|---|---|---|
|  | 1× | 5× | 10× | 15× | 20× | 25× |
| Test fabric ratings |  |  |  |  |  |  |
| Air-dried | 1.2 | 1.5 | 1.7 | 1.7 | 1.7 | 2.0 |
| Oven-dried 5 min | 1.2 | 1.2 | 1.2 | 1.5 | 1.5 | 1.5 |
| Oven-dried 10 min | 1.2 | 1.5 | 1.7 | 1.7 | 1.7 | 1.7 |
| Oven-dried 15 min | 1.2 | 1.2 | 1.7 | 1.5 | 1.5 | 1.5 |
| Oven-dried 20 min | 1.2 | 1.7 | 1.5 | 1.7 | 1.5 | 1.7 |
| Oven-dried 25 min | 1.2 | 1.2 | 1.2 | 1.5 | 1.5 | 1.2 |
| Control fabric ratings |  |  |  |  |  |  |
| Air-dried | 4.0 | 4.0 | 4.0 | 4.0 | 4.0 | 4.0 |
| Oven-dried 5 min | 4.5 | 4.5 | 4.5 | 4.0 | 4.0 | 3.5 |
| Oven-dried 10 min | 4.0 | 4.5 | 4.0 | 4.0 | 4.0 | 3.5 |
| Oven-dried 15 min | 4.5 | 4.0 | 4.0 | 4.0 | 3.0 | 4.0 |
| Oven-dried 20 min | 3.5 | 3.5 | 3.5 | 3.5 | 4.0 | 4.0 |
| Oven-dried 25 min | 4.0 | 4.0 | 4.0 | 4.0 | 4.0 | 4.0 |

EXAMPLE 3

Poly[hexamethylene adipamide]-poly[poly(oxyethylene) adipamide] copolymers are made substantially in accordance with the procedure described in the section above entitled "Preparation of Polymeric Composition", using quantities of nylon 6—6 salt, adipic acid, and a poly(oxyethylene) diamine appropriate to achieve the nylon 6—6 weight fractions shown in Tables I and II. One series of copolymers, with various nylon 6—6 weight fractions, is made from a poly(oxyethylene) diamine having a molecular weight of about 600. Two other series of copolymers, each with various nylon 6—6 weight fractions, are made from poly(oxyethylene) diamines having a molecular weight of about 900 and about 2000, respectively.

Coating compositions were made from each of the copolymers within the three series by adding the copolymer to a mixture of equal parts of ethanol and water in an amount sufficient to make a composition having a copolymer concentration of either 0.6% or 1.0%, the actual concentration selected being shown in the tables for each item listed. Sets of nylon upholstery velour fabric samples were soaked in each of the coating compositions as described in Example 2. After the fabric samples were taken out of the coating compositions and squeezed to remove excess coating composition, all of the fabric samples were dried in an oven at 125±5° C. for 25 minutes. The fabric samples were then evaluated in accordance with the soil release test, rating the samples to the nearest 0.5 unit.

In Table I are listed results obtained with the preferred copolymers of this invention. These copolymers were all found to have good soil release ratings (fabric rating 1.7 or lower after 5 washings, and a rating increase of no more than 1 unit after twenty washings). These copolymers were also all found to be soluble in equal parts of ethanol and water, item 7 apparently being about at the limit of solubility. Points representing the results in Table I are also shown on the graph which comprises FIG. 1, item 7 of Table I being located on the upper line defining the preferred region because the copolymer having this composition appeared to be about at the limit of solubility.

In Table II are listed results obtained with various other copolymer compositions. Items 1-3, 14, and 19-22 all involved copolymers made from a poly(oxyethylene) diamine having an average molecular weight of about 2000, which was a higher molecular weight than the poly(oxyethylene) diamines used to make the preferred copolymers of this invention. Items 1 and 2 involved copolymers which were applied as dispersions because they are insoluble in a mixture of equal parts of ethanol and water. These two items had acceptable soil release ratings through the first 5 washings but deteriorated thereafter and were rated unacceptable after 20 washings. Item 3 was mostly soluble and items 14 and 19-22 were soluble in a mixture of equal parts of ethanol and water. These items were all rated unacceptable because they all had soil release ratings higher than 1.7 after only 5 washings.

The copolymers of items 4 and 5, both of which had a relatively high content of nylon 6—6, were mostly soluble but contained some insoluble matter. Both of these were rated as unacceptable because they had soil release ratings higher than 1.7 after 5 washings.

Items 6-8 involved the same copolymer, made from a poly(oxyethylene) diamine of 600 average molecular weight and having a weight fraction of nylon 6—6 of 19%. Items 6 and 7 were rated unacceptable, while item 8 was rated acceptable, indicating that this copolymer was about at the borderline of the preferred range.

Items 9-13, 15, 16, and 23 all involved copolymers made from a poly(oxyethylene) diamine having an average molecular weight of about 900 and had a weight fraction of nylon 6—6 ranging from 20 down to 0%. Item 10 was rated as unacceptable because its soil release rating increased by more than one unit between the initial wash and the 20th wash, while the remaining items were rated as unacceptable because they had soil release ratings higher than 1.7 after 5 washings.

Items 17 and 18, which were both made from a poly(oxyethylene) diamine having an average molecular weight of about 600, had a weight fraction of nylon 6—6 of only 13% and 8%, respectively. These items were rated as unacceptable because both had soil release ratings higher than 1.7 after 5 washings, and they both also deteriorated in soil release ratings by more than one unit between the initial wash and the 20th wash.

TABLE I

| | SOIL RELEASE RATINGS OF COPOLYMER COMPOSITIONS PLOTTED IN FIG. 1 | | | | | | | | | |
|---|---|---|---|---|---|---|---|---|---|---|
| Item No. | POE—Diamine Mol Wt. | Wt. % 6-6 | Solubility in 50/50 EtOH/H$_2$O | Concentration of Coating Composition | Soil Release Rating After Indicated No. of Launderings | | | | | |
| | | | | | 1× | 5× | 10× | 15× | 20× | 25× |
| 1 | 600 | 22 | S | 0.6 wt. % | 1.5 | 1.5 | — | 1.5 | — | 2.5 |
| 2 | 600 | 24 | S | 0.6 | 1.5 | 1.5 | — | 1.5 | — | 1.5 |
| 3 | 600 | 26 | S | 0.6 | 1.5 | 1.5 | — | 1.5 | — | 1.5 |
| 4 | 600 | 27 | S | 1.0 | 1.5 | 1.5 | 2.0 | — | 2.0 | — |
| 5 | 600 | 30 | S | 0.6 | 1.5 | 1.5 | — | 2.0 | — | 2.0 |
| 6 | 900 | 23 | S | 0.6 | 1.5 | 1.5 | 2.0 | — | 2.0 | — |
| 7 | 900 | 27 | S* | 0.6 | 1.0 | 1.5 | 2.0 | — | 2.0 | — |
| Control 1 | — | — | — | 0.0 | 3.0 | 3.0 | 3.0 | — | 4.0 | — |
| Control 2 | — | — | — | 0.0 | 3.0 | 3.0 | 3.0 | — | 3.0 | — |
| Control 3 | — | — | — | 0.0 | 3.0 | 3.0 | 3.5 | — | 3.0 | — |

Code for Tables I and II:
S = soluble
S* = mostly soluble, but with some insoluble matter apparent
I = insoluble
POE = poly(oxyethylene)

TABLE II

SOIL RELEASE RATINGS OF VARIOUS COPOLYMER COMPOSITIONS

| Item No. | POE—Diamine Mol Wt. | Wt. % 6-6 | Solubility in 50/50 EtOH/H$_2$O | Concentration of Coating Composition | Soil Release Rating After Indicated No. of Launderings | | | | | |
|---|---|---|---|---|---|---|---|---|---|---|
| | | | | | 1× | 5× | 10× | 15× | 20× | 25× |
| 1 | 2000 | 22 | I | 0.6 wt. % | 1.5 | 1.5 | 2.5 | — | 3.5 | — |
| 2 | 2000 | 15 | I | 0.6 | 1.0 | 1.5 | 2.0 | — | 3.0 | — |
| 3 | 2000 | 11 | S* | 0.6 | 1.5 | 2.0 | 2.5 | — | 3.0 | — |
| 4 | 600 | 34 | S* | 0.6 | 2.0 | 2.0 | — | 1.5 | — | 3.0 |
| 5 | 900 | 33 | S* | 0.6 | 1.5 | 2.0 | 1.5 | — | 2.0 | — |
| 6 | 600 | 19 | S | 0.6 | 2.0 | 2.0 | — | 2.5 | — | 2.0 |
| 7 | 600 | 19 | S | 1.0 | 1.5 | 1.5 | 2.5 | — | 3.0 | — |
| 8 | 600 | 19 | S | 1.0 | 1.5 | 1.5 | 2.0 | — | 2.0 | — |
| 9 | 900 | 20 | S | 0.6 | 1.5 | 2.0 | 2.5 | — | 2.5 | — |
| 10 | 900 | 14 | S | 1.0 | 1.0 | 1.5 | 2.0 | — | 2.5 | — |
| 11 | 900 | 11 | S | 1.0 | 1.5 | 2.0 | 2.0 | — | 2.5 | — |
| 12 | 900 | 10 | S | 1.0 | 2.0 | 2.0 | 2.0 | — | 2.0 | — |
| 13 | 900 | 8 | S | 1.0 | 1.5 | 2.0 | 1.5 | — | 2.5 | — |
| 14 | 2000 | 7 | S | 1.0 | 1.5 | 2.0 | 1.5 | — | 2.5 | — |
| 15 | 900 | 6 | S | 1.0 | 2.0 | 2.0 | 2.5 | — | 2.5 | — |
| 16 | 900 | 3 | S | 1.0 | 2.5 | 2.5 | 2.5 | — | 2.5 | — |
| 17 | 600 | 13 | S | 1.0 | 1.5 | 2.0 | 2.5 | — | 3.5 | — |
| 18 | 600 | 8 | S | 1.0 | 1.5 | 2.5 | 3.0 | — | 4.0 | — |
| 19 | 2000 | 5 | S | 1.0 | 2.0 | 2.0 | 2.5 | — | 2.5 | — |
| 20 | 2000 | 4 | S | 1.0 | 1.5 | 2.5 | 3.0 | — | 3.0 | — |
| 21 | 2000 | 3 | S | 1.0 | 3.5 | 3.0 | 3.0 | — | 3.0 | — |
| 22 | 2000 | 1 | S | 1.0 | 2.5 | 2.5 | 3.5 | — | 3.5 | — |
| 23 | 900 | 0 | S | 1.0 | 2.5 | 3.5 | 2.5 | — | 3.0 | — |
| Control 1 | — | — | — | 0.0 | 3.0 | 3.0 | 3.0 | — | 4.0 | — |
| Control 2 | — | — | — | 0.0 | 3.0 | 3.0 | 3.0 | — | 3.0 | — |
| Control 3 | — | — | — | 0.0 | 3.0 | 3.0 | 3.0 | — | 3.0 | — |
| Control 4 | — | — | — | 0.0 | 3.5 | 3.0 | 3.5 | — | 3.0 | — |
| Control 5 | — | — | — | 0.0 | 3.5 | 3.5 | 3.0 | — | 3.0 | — |
| Control 6 | — | — | — | 0.0 | 3.0 | 3.0 | 3.0 | — | 3.0 | — |

We claim:

1. A polymeric composition consisting essentially of a poly[hexamethylene adipamide]-poly[poly-(oxyethylene) adipamide] copolymer that is soluble at room temperature at 1% by weight concentration in a solvent composed of equal parts by volume of water and ethanol and wherein the molecular weight of the poly[poly(oxyethylene) adipamide] grouping calculated as poly(oxyethylene)diamine is between about 300 and 1200, the weight fraction of poly(hexamethylene adipamide) calculated as nylon 6—6 salt is between 18 and 37, and said copolymer composition falls within the area bounded by XY, YZ and ZX of the FIGURE.

2. The copolymer of claim 1 wherein the molecular weight of the poly[poly(oxyethylene) adipamide] grouping is calculated as poly(oxyethylene) diamine is between about 600 and 900 and the weight fraction of poly(hexamethylene adipamide) calculated as nylon 6—6 salt lies between 19 and 30.

3. The copolymer of claim 1 wherein the amino groups are attached to the poly(oxyethylene) grouping through oxypropylene groups.

* * * * *